United States Patent
Wammes et al.

(12)

(10) Patent No.: US 6,522,082 B1
(45) Date of Patent: Feb. 18, 2003

(54) ELECTRONIC BALLAST FOR DISCHARGE LAMP COMPRISING DIELECTRICALLY IMPEDED DISCHARGES

(75) Inventors: Klaus Wammes, Alsheim (DE); Lothar Hitzschke, Munich (DE); Frank Vollkommer, Buchendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/763,707
(22) PCT Filed: Aug. 26, 1999
(86) PCT No.: PCT/DE99/02680
§ 371 (c)(1), (2), (4) Date: Feb. 26, 2001
(87) PCT Pub. No.: WO00/13472
PCT Pub. Date: Mar. 9, 2000

(30) Foreign Application Priority Data

Aug. 28, 1998 (DE) .......................................... 198 39 329

(51) Int. Cl.$^7$ ................................................ H05B 37/02
(52) U.S. Cl. ........................ 315/219; 315/224; 315/276
(58) Field of Search ................................. 315/224, 219, 315/276

(56) References Cited

FOREIGN PATENT DOCUMENTS

| EP | 781 078 A2 | 6/1907 |
|---|---|---|
| WO | 94/23442 | 10/1994 |
| WO | 97/26779 | 7/1997 |
| WO | 98/35536 | 8/1998 |
| WO | 99/35891 | 7/1999 |
| WO | 99/46963 | 9/1999 |

*Primary Examiner*—David Vu
(74) *Attorney, Agent, or Firm*—Carlo S. Bessone

(57) ABSTRACT

A description is given of an operating method for a discharge lamp with dielectrically impeded discharges and also a corresponding ballast and illumination system. The invention is directed at withdrawing the external lamp voltage across the discharge lamp in order to produce a back ignition in the lamp by virtue of an internal counterpolarization. The back ignition improves the efficiency of the lamp operation and makes it possible to construct a very small, lightweight ballast.

7 Claims, 7 Drawing Sheets

ELECTRONIC BALLAST FOR DISCHARGE LAMP COMPRISING DIELECTRICALLY IMPEDED DISCHARGES

TECHNICAL FIELD

The present invention relates to an operating method and a corresponding electronic ballast for a discharge lamp. In this case, the operating method and the ballast relate to a specific type of discharge lamp, in which so-called dielectrically impeded discharges are utilized to generate light. In order to produce such discharges, a dielectric layer is situated between at least one of the discharge electrodes and the discharge medium of the discharge lamp. The technology of discharge lamps with dielectrically impeded discharges is not discussed in detail here and, in this regard, reference is made to the prior art.

PRIOR ART

Technical development in this field has principally been concerned heretofore with the discharge lamp as such. One exception to this is an earlier patent application in respect of a relevant operating method with pulsed active power coupling into the discharge lamp. In this respect, reference is made to WO 94/23442, whose disclosure content is incorporated here by reference. The operating method presented therein forms the foundation for the invention described below.

In this case, the present invention is concerned with converting the operating procedure which is described in principle in the cited prior art into an operating method which is particularly advantageous in terms of electrical engineering, and an associated electronic ballast. When developing such an operating method and ballast, the aim generally is to fulfil various quality criteria in an overall compromise which is as favorable as possible. Firstly, an electronic ballast should be operated as power-efficiently as possible in order to obtain, together with the efficiency of the lamp, a good overall efficiency of an illumination system comprising discharge lamp and ballast.

A second aspect concerns the electronic ballast having a compact and lightweight design made possible by a corresponding operating method, which ballast, in this respect, is also suitable for installation in the case of confined space conditions or weight restrictions. This has a significant part to play precisely in the areas of application which are of particular interest with regard to discharge lamps with a dielectrically impeded discharge. Examples are backlighting systems for flat screens or copying lamps, which will be discussed further on in the description.

Finally, economic advantages with regard to mass production costs and service life and frequency of failure are intended to be attained.

SUMMARY OF THE INVENTION

The invention is based on the technical problem, proceeding from the technical teaching of WO 94/23442, of specifying a particularly favorable operating method using a ballast, and an illumination system and ballast designed for this.

For this purpose, the invention provides an operating method for a discharge lamp having a dielectric layer between at least one electrode and a discharge medium using a ballast having a power-supplied primary circuit, a secondary circuit containing the discharge lamp, and also a transformer which connects the primary circuit to the secondary circuit, in which method a voltage pulse is impressed on the secondary circuit from the primary circuit via the transformer, which voltage pulse leads to an external voltage $U_L$ effecting an ignition across the discharge lamp L and to an internal counterpolarization in the discharge lamp, characterized in that, by means of the ballast, afterward the charge effecting the external voltage across the discharge lamp is withdrawn from the discharge lamp and, in this way, the discharge lamp is led to effect a back ignition by the remaining internal counterpolarization.

Furthermore, the invention relates to an illumination system having a discharge lamp and a ballast which is designed for the operating method according to the invention.

Finally, the invention also relates to a particular design of a ballast which is suitable for the operating method, namely in the form of a forward converter.

The various dependent claims relate to preferred refinements of the invention.

The invention thus provides an operating method for a discharge lamp of the type already described, in which a ballast is used. For the purposes of this invention, this ballast, which is preferably an electronic ballast, comprises a primary circuit which is supplied with power in a manner that is of no further interest here, and a secondary circuit into which the lamp is intended to be connected or is connected. The primary circuit and the secondary circuit are coupled via a transformer via which power can be coupled into the secondary circuit from the primary circuit.

Provision is now made for coupling a voltage pulse into the secondary circuit via the transformer, which voltage pulse leads to an external voltage across the discharge lamp. The subsequent behavior of the discharge lamp itself is of importance for the concept underlying the invention. Specifically, it has been found that, in the discharge lamps with dielectrically impeded discharges which are considered here, a counterpolarization occurs in the discharge lamp as a dielectric reaction to the external voltage and as a result of a discharge ignited by an external voltage.

To be precise, after the ignition voltage has been reached, discharges are formed in the discharge medium, as is described in more detail in the foundation application pertaining to the operating method, to which reference has already been made. As a consequence, charge carriers move to the dielectric layer on one of the electrodes and accumulate to an increasing extent on the dielectric layer. This creates an internal counterpolarization relative to the external field which increases until an overall field is no longer present in the discharge medium, which also means that current can no longer flow through the lamp. As a result, the discharge medium has changed from a behavior acting as an ohmic load—although with time-variable resistance—to an electrical behavior manifested as capacitance.

Added to this is the fact that further capacitances are connected in series with the discharge medium, to be precise in particular through one or a plurality of dielectric layers on the electrodes.

Proceeding from this physical behavior of the discharge lamp, the fundamental concept of the invention consists, then, in not interpreting this internal counterpolarization as a disturbing effect, but rather integrating it functionally into the operating method and also into the functional principle of the associated ballast. In this sense, the operating method according to the invention provides for the external voltage across the discharge lamp, which originally caused the counterpolarization just described, to be withdrawn again from the discharge lamp sufficiently rapidly in order to have the internal counterpolarization lead to a further ignition in the opposite direction after the first ignition effected by the external voltage. This second ignition is in this case designated as back ignition and is not attributed, at any rate not completely, to an external voltage but rather, at any rate at least partly, to the internal counterpolarization.

In this application, for the sake of clarity of explanation, it is thus argued that the external voltage across the discharge lamp or the internal counterpolarization effects an ignition. For the sake of completeness, however, this must also be expanded by stating that the ignition behavior of the lamp depends on a number of further parameters. In particular, the edge steepness or the dissipation when building up a voltage across the lamp or a field in the lamp has a significant part to play. This means that, for example, an ignition on account of an external voltage across the discharge lamp takes place at smaller voltage values if said external voltage is built up very rapidly. This basically empirical result can probably be explained by the fact that the electrodes can follow the field rise more poorly, possibly also by the fact that with a steeper voltage rise and thus a larger proportion of high-frequency Fourier components on the voltage profile, the high-frequency conductivity in particular of the dielectric is improved and the field actually prevailing in the discharge medium is thus enlarged.

Other time parameters also play a part, for instance the so-called dead time between the individual active power pulses. The longer this dead time is chosen to be, the smaller the residual ionization which remains at the end of the dead time, and thus the higher the voltage which is necessary for renewed ignition.

The problems associated with these relationships will not be discussed further in the rest of this application because they are not directly connected with the principle of this invention. However, it must be kept in mind that a significant part is played not only by the pure voltage values and the lamp parameters for the ignition and back ignition behavior, but also by the temporal parameters of the operating method.

With regard to the temporal order and the designations first ignition and back ignition used below, it should be noted that this operating method, apart from the start of the discharge lamp, is of course directed at a continuous discharge operation, so that the back ignition is again followed by a "forward ignition", that is to say first ignition. However, only a basic unit of this repeated sequence will be considered in the description of the invention, in which case, for the sake of simplicity, the "first" ignition is referred to the external voltage. Moreover, it is not absolutely necessary here for the operating method overall to be strictly periodic.

Accordingly, the invention also relates to an illumination system, in this case meaning a system comprising a discharge lamp and a ballast which are designed for operation according to the operating method according to the invention. To that end, the ballast must be suitably coordinated with the respective discharge lamp, with regard to the method of functioning intended by the invention, above all with regard to the capacitance.

The back ignition according to the invention has the following essential advantages: firstly, at least a considerable part of the energy which has passed to an extent unavoidably into the counterpolarization is converted into light generation by the back ignition and the overall energy utilization is thus improved. Although the counterpolarization could also be suitably reduced in such a way that the energy stored therein can flow back into the primary circuit via the transformer, this is, of course, associated with an overall increase in losses, because the proportion which has passed back into the primary circuit must again pass via the transformer and the secondary circuit into the discharge lamp in order to be made utilizable.

Furthermore, it emerges from the improved energy utilization and, in particular, also in comparison with a reduction of the counterpolarization in the form of feedback into the primary circuit that the circuit of the ballast can be designed to be smaller for a given discharge lamp power. This follows simply from the fact that, with the aid of the invention, the same discharge lamp power can be supplied with a primary circuit which is designed toward smaller power levels, to be precise by virtue of the better energy utilization on the secondary-circuit side and by virtue of the obviation or reduction of the need to feed amounts of energy not "consumed" on the secondary-circuit side back to the primary-circuit side. To the extent of an improvement of the energy utilization as such, the secondary-circuit side can also be designed toward smaller power levels.

Finally, it has also been found that the back ignition is advantageous for the discharge physics in the discharge lamp itself, in that it homogenizes the local distributions of different chemical species and charge carriers. Thus, the mode of operation according to the invention, with back ignitions following first ignitions, should not be understood in the sense that back ignitions are to an extent accepted for electrical engineering reasons, rather that, both from the perspective of the physics of the discharge medium and from an electrical engineering standpoint, it represents a particularly favorable realization of the underlying pulsed mode of operation in accordance with the application to which reference has been made.

From the inventors' viewpoint, it is useful, for an understanding of the effects underlying the invention, to make it clear that in the discharge lamps considered by the invention, in comparison with metals, charge carrier concentrations occur which are typically lower by many orders of magnitude, so that external fields can be compensated by an opposing field only with the covering of comparatively larger distances by the respective mobile charge carriers. These very much larger distances in comparison with quasi instantaneously shielding metals result in time delays, from which it has been found that they can already constitute a significant effect in the range of typical pulse frequencies of the pulsed mode of operation considered here.

What the invention involves, then, is a matter of leading the secondary circuit to withdraw the external voltage from the discharge lamp in the time period between the first ignition and the back ignition. As explained below, this can be done, in particular, by allowing the secondary circuit to oscillate through as far as possible in an unbraked manner, that is also possible, according to the invention, by means of intervention on the part of the primary circuit, for instance by means of shifting in the correct phase, or by means of a pulse which is coupled in at a suitable location and supports the charge transfers according to the invention in the secondary circuit. Reference is made to the disclosure content of the parallel application "Electronic ballast for discharge lamp with dielectrically impeded discharges" by the same applicant on the same application day and with the file reference 198 39 336.9.

According to a more specific aspect of the invention, the back ignition in the discharge lamp is also used for a further function over and above the aspect of improved energy utilization. This further function concerns the demagnetization of the transformer in the ballast.

In this respect, it must firstly be explained that in the case of a ballast having the above-described construction comprising a primary circuit and a secondary circuit connected to the primary circuit via a transformer, in the case of active power coupling into the secondary circuit in a pulsed manner, generally a certain residual magnetization remains in the transformer after the first ignition in the jargon of this application. In the prior art, a very large number of different possibilities have been proposed for reducing this residual magnetization in order that the transformer is not driven directly into magnetic saturation during continuous operation by amounts of residual magnetization which repeatedly build up on one another. By way of example, it is possible to use circuits comprising demagnetization coils and diodes, said circuits being connected parallel with the primary side of the transformer. An example of a relatively complicated solution is shown by U.S. Pat. No. 4,739,285. At any rate, conventional ballasts from the prior art have, in principle, demagnetization circuits configured in some way.

According to the invention, then, in conjunction with the withdrawal of the external voltage or the charge effecting the latter from the discharge lamp in preparation for the back ignition, at least a considerable part of the residual magnetization in the transformer is removed at the same time. As a result, depending on the exact embodiment of the circuit, demagnetization circuits according to the prior art can either be completely omitted or actually be designed with regard to distinctly smaller amounts of residual magnetization. In particular, it is alternatively possible to work without any demagnetization circuit, in that the secondary-circuit side, as a result of the back ignition, largely consumes the amount of energy corresponding to the residual magnetization from the transformer and any remaining small amount of energy can, if appropriate, be suitably fed back into the primary circuit through the transformer itself, but does not necessarily have to be fed back. This will be explained in further detail below.

Finally, it must be established here that the residual magnetization in no way has to be returned to zero after the back ignition in the case of this invention. More generally, it is not necessary for the secondary circuit to become entirely energy-free after the back ignition. All that is crucial is that a saturation state of the transformer be avoided. Furthermore, a voltage possibly remaining across the discharge lamp—taking account of the steepness of the edges occurring—must not, of course, reach the ignition voltage. In this sense, the associated claims should be understood such that the intention is to make at least a contribution to the demagnetization of the transformer.

An advantage of the invention's demagnetization of the transformer by the reduction of the external voltage across the discharge lamp and the back ignition is firstly the possibility of either avoiding demagnetization circuits entirely or designing them to be smaller. The preferred case is the one in which the ballast according to the invention has no separate demagnetization circuit. As a result, the circuit not only becomes more efficient but also simpler and less expensive. The omission of the components associated with a conventional demagnetization circuit means that it is also possible to achieve a gain in reliability. In particular, however, it has been found to be an essential advantage of the invention that corresponding ballasts can be made quite considerably much smaller and lighter than conventional comparison circuits. This is quite a considerable advantage for many applications, for example in the areas of copying lamps or of flat screen backlighting systems already mentioned.

Finally, complete DC isolation between the primary-circuit side and the secondary-circuit side can also be achieved by the transformer if no such demagnetization circuits which connect these two circuits are present. This is highly desirable for safety reasons.

The invention furthermore relates to a concrete circuit embodiment or circuit operating mode for the operating method according to the invention, which has already been generally described. In the case of this preferred circuit embodiment, the secondary circuit is considered as a resonant circuit after the voltage pulse has been impressed—at the latest after the building-up of the external voltage across the discharge lamp. In this case, the charge connected with the external voltage across the discharge lamp is allowed to drain away from the discharge lamp in an electromagnetic oscillation and the counterpolarization, until the back ignition, is thus to an extent allowed time until the external voltage has fallen to a sufficient extent. In this case, the oscillation need not necessarily be a fully free oscillation, but it is essential for this concrete circuit embodiment that external "triggering" of the back ignition can be dispensed with.

To that end, a forward converter, in particular, is suitable as ballast, in which the primary circuit impresses the voltage pulse into the secondary circuit with direct temporal coupling between a primary-circuit current through the transformer and the corresponding secondary-circuit induced current. In the case of the forward converter, therefore, a corresponding primary-side transformer current also flows at the instant of voltage generation on the secondary-circuit side. The building-up of the external voltage across the discharge lamp takes place with a corresponding charge-reversal time delay.

In this case, it is preferred for the secondary circuit to be isolated as a resonant circuit after the generation of the voltage pulse and after the ignition in the discharge lamp, that is to say, in particular, not to be greatly damped by a further induced current flow on the primary-circuit side of the transformer. For this purpose, a switch may be provided on the primary-circuit side, which switch interrupts the transformer current at a given instant and thus isolates the secondary circuit as a resonant circuit.

If such a switch in the primary circuit for controlling the primary-side current flow through the transformer is conceptually combined with its control, adapted to the method according to the invention, to form a switching device, then a ballast without a discharge lamp connected thereto is already characterized by this switching device according to the invention in the primary circuit of the forward converter. Thus, the invention is not produced by joining together an inherently conventional ballast with a corresponding discharge lamp solely by a suitable choice of the corresponding electrical quantities with an otherwise conventional circuit construction. On the contrary, it is embodied in the switching device according to the invention, i.e. in a switch—suitably arranged in the primary circuit—with a drive device which is characteristic of the method according to the invention.

The fact of whether a sufficiently complete draining of the charge from the discharge lamp is possible in a sufficiently short time in the case of the forward converter ballast depends on the frequency of the intended oscillation. According to the invention, frequencies in the region of at least 100 kHz are preferred here in order that a sufficiently rapid draining of charge can be achieved. Frequencies of at least 200 kHz or 300 kHz are particularly preferred.

However, it is not stipulated in the case of the invention how to assess the time period between the "forward ignition" and the back ignition in the sense of the already cited foundation method of the pulsed mode of operation. In principle, there are two alternative possibilities. In one case, both associated pulses are considered as a uniform active power coupling-in, which are separated from one another by a distinctly shorter period of time than the corresponding dead times according to this method. To that end, the oscillation frequency should lie above the abovementioned values.

On the other hand, it is alternatively possible to allow the secondary circuit to oscillate through very slowly, which may be expedient in particular in the case of very large lamp capacitances, that is to say primarily in the case of very large lamps. The time period between the first ignition and the back ignition can then also be interpreted as a dead time, that is to say typically lie in the range from 5 µs to 1 ms. However, this requires the time delay with which the internal counterpolarization in the discharge lamp follows the reduction of the external voltage to be sufficiently long. To that end, natural frequencies of the secondary circuit of at most 33 kHz, better 15 or 10 kHz, are preferred.

In connection with the already mentioned possibility of performing a feeding-back of energy from the secondary circuit into the primary circuit via the transformer itself, it is important to permit or to prevent the primary-circuit-side current flow through the transformer after the first ignition. If this current flow is permitted by an on state of a corresponding switch, an inductive coupling to the primary circuit and thus a feeding-back of energy result in connection with the back oscillation of the secondary circuit and the associated draining of the charges from the discharge lamp.

This feeding-back of energy does not, in principle, obstruct the invention but reduces the energy available for the back ignition in the secondary circuit. In the sense of this invention, it is preferred for as much as possible of the energy which remains in the secondary circuit after the first ignition to be converted into light generation in the back ignition, so that the primary-circuit-side current flow through the transformer is preferably interrupted directly after the first ignition. Thus, feeding back from the secondary circuit into the primary circuit can be correspondingly suppressed or reduced.

With regard to the concrete technical configuration of the ballast, it has been found to be very favorable to supply the primary circuit with power from a source with a ceramic multilayer capacitor as storage capacitor. Two essential advantages are associated with this. Firstly, in the case of these capacitors, there is a distinct reduction in back perturbations of high-frequency interference from the ballast into the supply network. The ceramic multilayer capacitors have, as it were, a low-pass filter effect. Furthermore, such capacitors have very low internal resistances and thus allow a rapid build-up of corresponding supply currents for the transformer in the primary circuit. Moreover, they exhibit significantly longer services lives than the electrolytic capacitors that are usually used.

As already mentioned several times, the entire ballast and thus also the operation of the discharge lamp can be clocked by a switch in the primary circuit and correspondingly controlled current flow through the primary-circuit side of the transformer. Such primary-circuit clocking is a preferred choice in the case of this invention. It must be noted, however, that other possibilities for clocking the ballast and the discharge lamp also lie within the scope of the invention, for instance by means of a switching device in the secondary circuit.

A further preferred refinement of the invention relates to a secondary winding of the transformer having a center tap, in the case of which safety improvements and an improvement of the electromagnetic compatibility can be achieved by choosing the center tap potential as floating reference-ground potential in the secondary circuit and supplying the discharge lamp by the positive and negative voltages with respect to said reference-ground potential at the external taps of the secondary winding. This is essentially due to the fact that in the secondary circuit, with regard to the high-voltage danger and the electromagnetic radiation, essentially half the voltage actually applied to the discharge lamp occurs. Furthermore, the radiated interference signals partly cancel one another out on account of the edges in opposite directions.

Up to this point, mention has been made of a voltage pulse which is impressed into the secondary circuit from the primary circuit via the transformer and leads to an external voltage across the discharge lamp. In this case, the invention is not restricted in respect of whether temporally successive external voltage pulses across the discharge lamp always have the same sign or perform a sign change in some way. In many cases it is preferred to work with a unipolar operating method, in which the external voltage across the discharge lamp which is generated by a voltage pulse always has the same sign. In this case, therefore, the current direction of a "forward ignition" is always the same. One advantage of this method is e.g. that, with regard to the electrode structure of the discharge lamp, a distinction can be made between cathodes and anodes, only the anodes having to have a dielectric layer for isolation from the discharge medium.

On the other hand, a bipolar operating method may alternatively be preferred, in which the sign of the external voltage across the discharge lamp changes alternately from voltage pulse to voltage pulse. However, it is then necessary to use discharge lamps in which all electrodes are suitable as anode, that is to say have a dielectric layer.

One advantage of a bipolar operating method may, for example, consist in a balancing of the discharge conditions in the lamp, said balancing going still further beyond the back ignition principle according to the invention. Problems caused by asymmetrical discharge conditions are thus avoided particularly effectively, e.g. instances of ion migration in the dielectric which can lead to blackening, or space charge accumulations which impair the efficiency of the discharge.

With regard to the operating method according to the invention, it is preferred, if bipolar operation is intended, that, for this purpose, provision be made for a direction reversal of the primary-circuit-side current in the transformer, said current effecting the voltage pulse in the secondary circuit. This is generally simpler than taking corresponding electrical-engineering measures for direction reversal on the secondary-circuit side.

In particular, the transformer may have, for this purpose, two primary-circuit-side windings which are respectively assigned to one of the two current directions, that is to say are used for a primary-circuit current of only one of the two directions. This means that current is alternately applied to the two primary-circuit-side windings. By way of example, this can be done by using two clocking switches in the primary circuit which respectively clock the current through an assigned winding of the two windings. As a result, each of the two current directions is assigned a dedicated clock switch and a dedicated primary-circuit-side winding of the transformer.

If a ballast according to the invention is used on an alternating-current source, it may be advantageous, with regard to the two primary-circuit-side current directions, to use two storage capacitors which are alternately charged from the alternating-current source in a half-cycle by half-cycle manner. In other words, the alternating-current half-cycles of one sign are used for one of the storage capacitors and the alternating-current half-cycles of the other side are used for the other storage capacitor. The currents for a respective direction can then be drawn from these two storage capacitors. This can be done together with the depicted double embodiment of the primary-circuit winding of the transformer, but this is actually not necessary here. Instead, a single primary-circuit-side winding can be supplied alternately by the two storage capacitors by means of corresponding switches, each storage capacitor being respectively assigned to a current direction. In order to feed the storage capacitors from the alternating-current source, it is possible to use a corresponding rectifier circuit whose details are clear to the person skilled in the art without further elaboration.

DESCRIPTION OF THE DRAWINGS

The invention is explained in detail below using concrete exemplary embodiments. The features disclosed in the process may also be essential to the invention in each case individually or in different combinations from those represented. In the figures.

Figure 1:
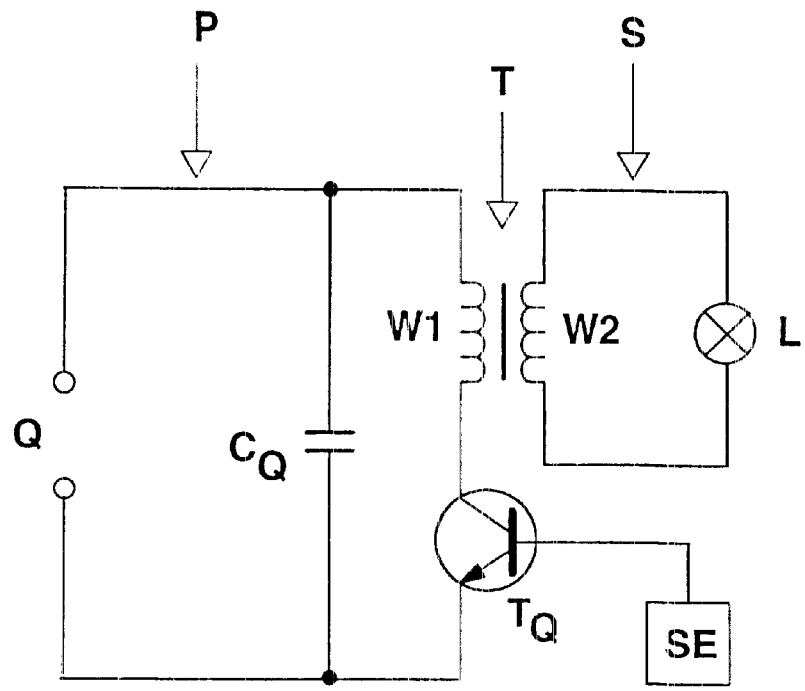
FIG. 1 shows a schematic block diagram of an illumination system according to the invention.

A schematic block diagram for an illumination system according to the invention is represented in FIG. 1, in which, firstly, L represents a discharge lamp which is designed for dielectrically impeded discharges. A basic equivalent circuit diagram for the discharge lamp L will be explained below with reference to FIG. 2. The actual construction of the discharge lamp L is not crucial for understanding the operating method, illumination system and ballast according to the invention.

The discharge lamp L is connected into a secondary circuit S containing, in addition to the discharge lamp L, a secondary winding W2 of a transformer T.

The primary winding W1 of the transformer T is located in a primary circuit P, which is supplied with power for the transformer and the discharge lamp L from a power supply Q.

Furthermore, a fast switch $T_Q$ is located in one of the branches between the power source Q and the primary winding W1. This switch is a power MOSFET which is switched or controlled by a control device SE.

A storage capacitor $C_Q$ is connected in parallel with the series circuit comprising the primary winding W1 and the switch $T_Q$. This storage capacitor $C_Q$ is recharged by the source Q, basically belongs to the source Q and serves for the application of a voltage to the primary winding W1 depending on the switching state of the switch $T_Q$. This involves ceramic multilayer capacitors.

In the case of the forward converter, a current flow through the primary winding W1 is generated initially in a conventional manner, the turns ratio of the transformer T being designed such that the current flow through the primary winding W1 induces an ignition voltage in the secondary winding W2 and thus indirectly across the discharge lamp L. If the switch $T_Q$ is opened by the control device SE, then energy at least in the form of a residual magnetization of the transformer T remains in the secondary circuit S.

As already explained in the introduction to the description, demagnetization circuits have conventionally been used to reduce said residual magnetization, which might comprise e.g. a third winding of the transformer T and a diode connected with said winding in parallel with the series circuit comprising the primary winding W1 and the switch $T_Q$. Using such a demagnetization circuit, the residual magnetization of the transformer T could then be reduced in the off phase of the switch $T_Q$.

It is directly apparent from FIG. 1 that there is complete DC isolation between the primary circuit P and the secondary circuit S. This is a considerable safety advantage with regard to the high voltages present on the secondary-circuit side. A further safety advantage can be achieved by virtue of the fact that the secondary winding W2 has a (third) center tap which can serve as "floating" reference-ground potential of the secondary circuit S. By contrast, if the positive and negative pulses from the secondary winding W2 are applied to the respective electrode groups of the discharge lamp L, the full induced voltage is still present across the discharge lamp L, although in each case only half the maximum voltage occurs as safety-relevant voltage in the secondary circuit relative to the center tap potential.

This technology also considerably improves the electromagnetic compatibility with regard to radiation from the secondary circuit. Reference is made to DE 197 34 885.8.

Figure 2:
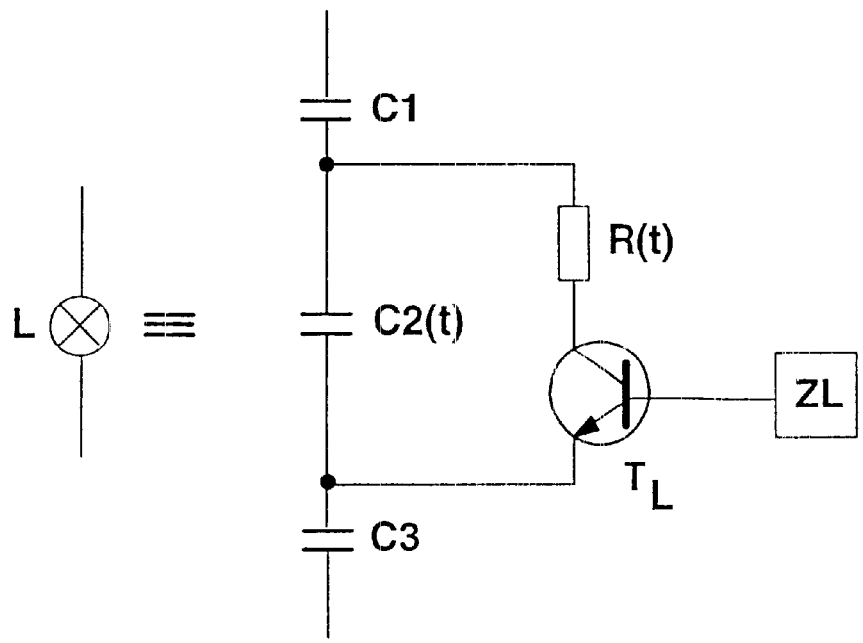
FIG. 2 shows a schematic equivalent circuit diagram for the discharge lamp from FIG. 1.
Figure 3:
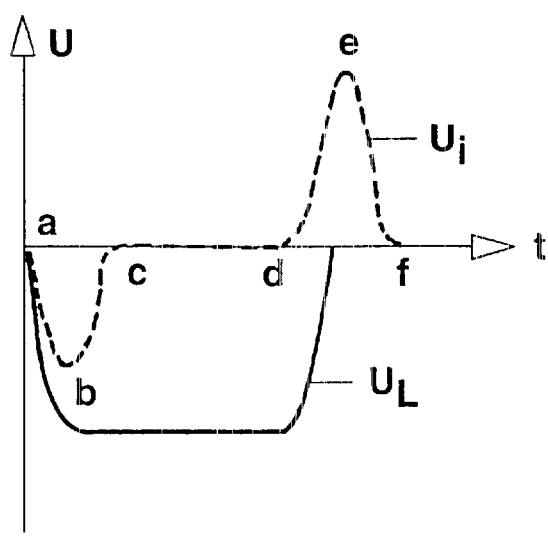
FIG. 3 shows a greatly simplified diagram for illustrating the relationship between the external voltage and the internal counterpolarization across and in the discharge lamp.

Before the invention's embodiment of the illumination system illustrated in FIG. 1 is described, the electrical behavior of the discharge lamp L shall firstly be considered in more detail with reference to FIGS. 2 and 3. During the ignition operation already described, the transformer T generates a voltage which is present across the discharge lamp L and is proportional to the time derivative of the primary-circuit-side transformer current. In this case, the illumination system is designed in such a way that the current discharge interacting with the transformation ratio of the transformer T generates, after the closing of the switch $T_Q$, a sufficiently high external voltage across the discharge lamp L in order to allow the latter to arc through.

Discharges in which charge carriers move to the dielectric layer on the electrodes form in the discharge medium of the discharge lamp L. In this connection, gas discharge lamps which are preferably considered are ones in whose gas space the electrons are the far more mobile charge carriers and thus practically solely determine the discharge dynamics with respect to the ion cores. When the electrons have moved to the dielectric layer on the anode, they accumulate on the surface of the dielectric layer and increasingly shield the electric field generated by the external voltage.

In this connection, it should be noted that in the case of the circuit variant illustrated in FIG. 1, the external voltage always has the same polarity, if an anode is fixed in the discharge lamp L. As already mentioned, however, this does not restrict the invention to unipolar operating methods; rather, the scope of the invention also includes bipolar methods and illumination systems in which the polarity of the external voltage alternates, that is to say the electrodes are alternately operated in the anode role and the cathode role. This will be explained with reference to FIGS. 8 and 9.

To come back to the shielding, just described, of the field generated by the external voltage, this is effected with a time delay defined by various parameters of the discharge lamp L (pressure and composition of the discharge atmosphere, electrode geometry, dimensions of the discharge volume . . . ). This shielding can then extinguish the discharge in the discharge lamp L, even though the external voltage lies above the required ignition voltage.

This can be discerned in the simplified diagram in FIG. 3, where the time t is plotted on the abscissa and the voltage U is plotted on the ordinate. In this case, the solid line shows the external voltage $U_L$ and the broken line shows the internal voltage $U_i$ which results from the superposition of the external voltage $U_L$ and the internal counterpolarization and corresponds to the field actually prevailing in the discharge medium.

In accordance with the previous description, the external voltage $U_L$, proceeding from the point a, has risen rapidly toward negative values in the diagram in FIG. 3, while the internal voltage $U_i$, proceeding from a, has increasingly decoupled from the external voltage $U_L$. The plasma ignites in the progression from a to b. Even before the plasma ignition, there arises an internal counterpolarization and thus a deviation of the internal voltage. $U_i$ from the external voltage $U_L$. At the point b, the internal voltage reverses in the time derivative and, as a result of the increasing internal counterpolarization, becomes smaller and smaller until it reaches the value zero at c. In this example, the internal voltage $U_i$ reverses before the external voltage $U_L$ reaches its maximum.

To afford a better understanding, the maximum of the external voltage $U_L$ is depicted with a somewhat exaggerated width. This is intended to illustrate that field freedom prevails in the lamp and a discharge can no longer be maintained while the external voltage $U_L$ still has large values, possibly even the maximum value.

In the equivalent circuit diagram from FIG. 2, this means that the discharge lamp L has changed over from a load behavior as a time-dependent ohmic resistor R(t) with the extinguishing of the discharge to a purely capacitive behavior as a capacitor. This can be imaged in the diagram in FIG. 2 by a switching operation of the model-like switch $T_L$, which is to an extent controlled by an ignition logic ZL of the discharge lamp L. The capacitances C1 and C3 that are furthermore depicted in the circuit diagram in FIG. 2 are capacitances of the electrodes and of the dielectric layer applied at least on the anodes. In this case, dielectric layers may also be present both on the anodes and on the cathodes.

In the unignited or even no longer ignited state, the discharge lamp L thus acts as a series circuit of capacitors.

An essential aspect of the invention resides, then, in coordinating the overall system (designated here as illumination system) comprising the discharge lamp L and the ballast in such a way that the time constant which occurs with regard to the reaction of the internal counterpolarization can be utilized for the intended back ignition. This can be discerned in the right-hand part in FIG. 3, in which, as a result of the drop in the external voltage $U_L$, the internal counterpolarization which is not decreasing in a directly following manner then builds up an internal voltage $U_i$ which rises in the opposite direction, that is to say toward positive voltages in FIG. 3, to a level above the ignition voltage limit. This is manifested in the rise of the broken curve of the internal voltage $U_i$ between the points d and e.

After the drop in the external voltage $U_L$, the internal voltage, that is to say the internal counterpolarization in this case of disappearing external voltage $U_L$, falls again from the point e to the point f. In this case, the point where the external voltage $U_L$ disappears need not necessarily coincide with the maximum of the internal voltage $U_i$. All that is essential is that the external voltage $U_L$ fall so rapidly, and that the internal counterpolarization react comparatively so slowly, that the ignition voltage can be exceeded a further time in the opposite direction.

In the equivalent circuit diagram for the discharge lamp L as illustrated in FIG. 2, the time profile from d to f in FIG. 3 signifies that the switch $T_L$ is switched on again by the ignition logic ZL, but in this case the time-dependent resistance R(t) assumes formally negative values.

Figure 4:
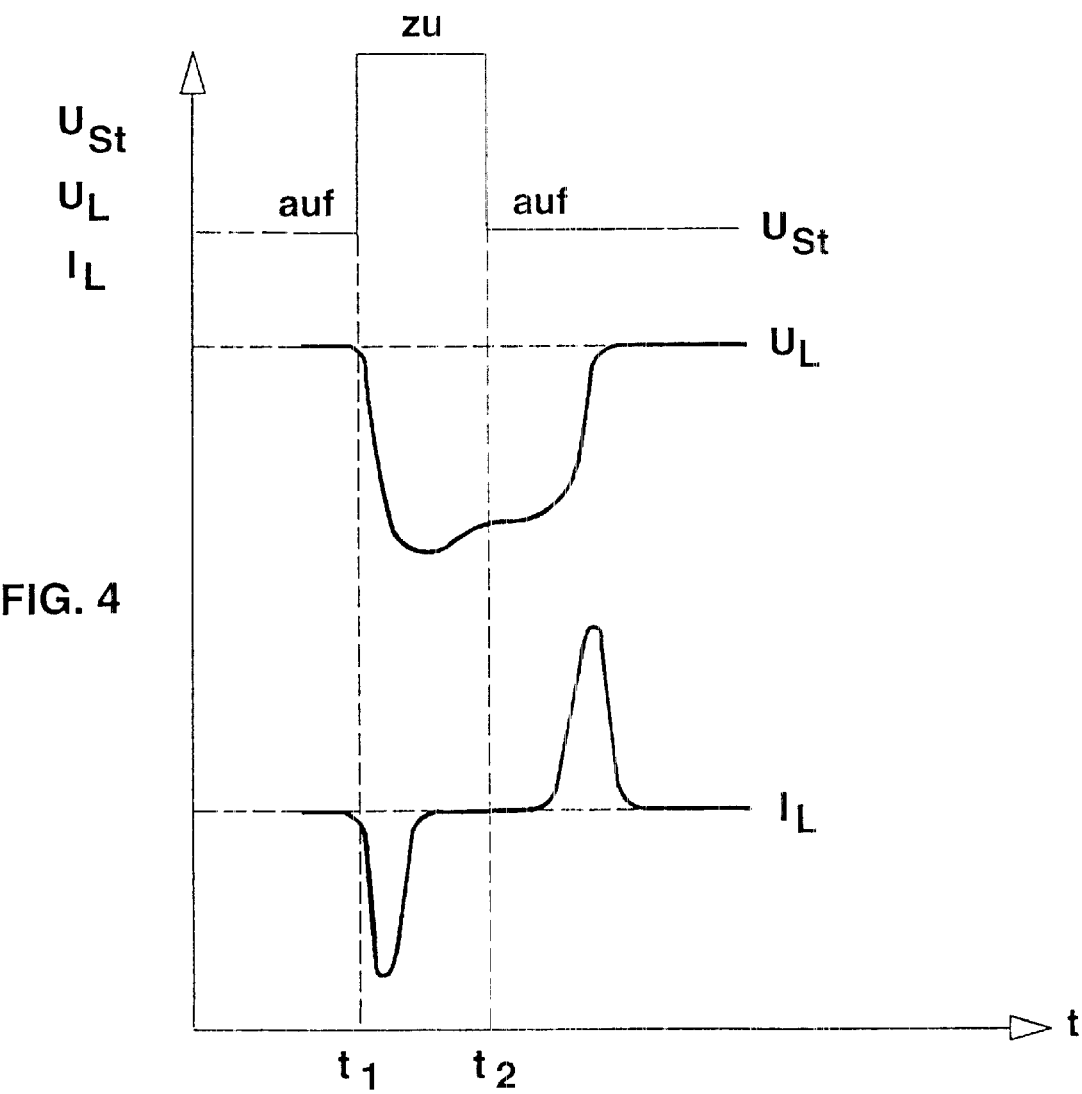
FIG. 4 shows a greatly simplified diagram for illustrating the basic principle of the forward converter ballast according to the invention.

FIG. 4 then illustrates how the illumination system illustrated in FIG. 1 achieves the fall in the external voltage $U_L$ in the manner according to the invention. The upper region of the figure illustrates the control voltage $U_{St}$ at the switch $T_Q$ in FIG. 1, that is to say the output signal $U_{St}$ of the control device SE, the high level of $U_{St}$ corresponding to a closed state of the switch $T_Q$.

As a result of the switch $T_Q$ being closed, the forward converter generates an induced voltage in the secondary winding W2 and thus an external voltage $U_L$ across the discharge lamp L. This corresponds to the sharp rise in the central curve in FIG. 4 toward negative values. At the same time, the lamp current $I_L$, represented in the lower curve, rises in the negative direction analogously to the representation of the internal voltage $U_i$ in FIG. 3. This first negative peak of the lamp current $I_L$ after the instant $t_1$ corresponds to the first ignition.

According to the invention, the switch $T_Q$ is opened by the control device SE in the region of the negative maximum of the lamp voltage $U_L$ or, as also illustrated for the sake of better clarity in FIG. 4, somewhat thereafter, at the instant $t_2$ in FIG. 4. As a result, a primary-circuit-side current flow through the primary winding W1 of the transformer T is interrupted and the secondary circuit S is isolated. The secondary circuit S then behaves as a resonant circuit essentially comprising the inductance of the secondary winding W2 of the transformer T and a total capacitance comprising the capacitances C1, C2 and C3—illustrated in FIG. 2—of the discharge lamp L and a capacitance of the secondary winding W2.

The profile of the lamp voltage $U_L$ which follows the instant $t_2$ in FIG. 4 is intended to represent a flowing-back— corresponding to this free oscillation of the secondary circuit S—of the charge which is capacitively coupled with the external voltage $U_L$ across the discharge lamp L, from the discharge lamp L through the secondary winding W2. This fall in the external voltage $U_L$ corresponds to the right-hand region of the model-like representation in FIG. 3. Accordingly, as a result of the remaining internal counterpolarization in the discharge lamp L, an internal voltage $U_i$ arises which leads to a back ignition of the discharge lamp L in the opposite direction. This is shown by the second, now positive, peak of the lamp current $I_L$ in FIG. 4. Note that despite unipolar external active-power impressing, a fundamentally bipolar active-power conversion occurs in the discharge lamp L itself.

After the back ignition, the sequence schematically represented in FIG. 4 begins anew with a renewed switch-on of the switch $T_Q$ by the control device SE. In this case, the invention is preferably directed toward the case where the time which elapses until a renewed switch-on of the switch $T_Q$, that is to say a renewed "first ignition", corresponds to a dead time in the sense of the pulsed mode of operation considered here. By contrast, the time between the first ignition and the back ignition should be as short as possible. The two ignition pulses in FIG. 4 should then be rated as uniform active power coupling-in in the sense of the pulsed mode of operation.

Figure 5:
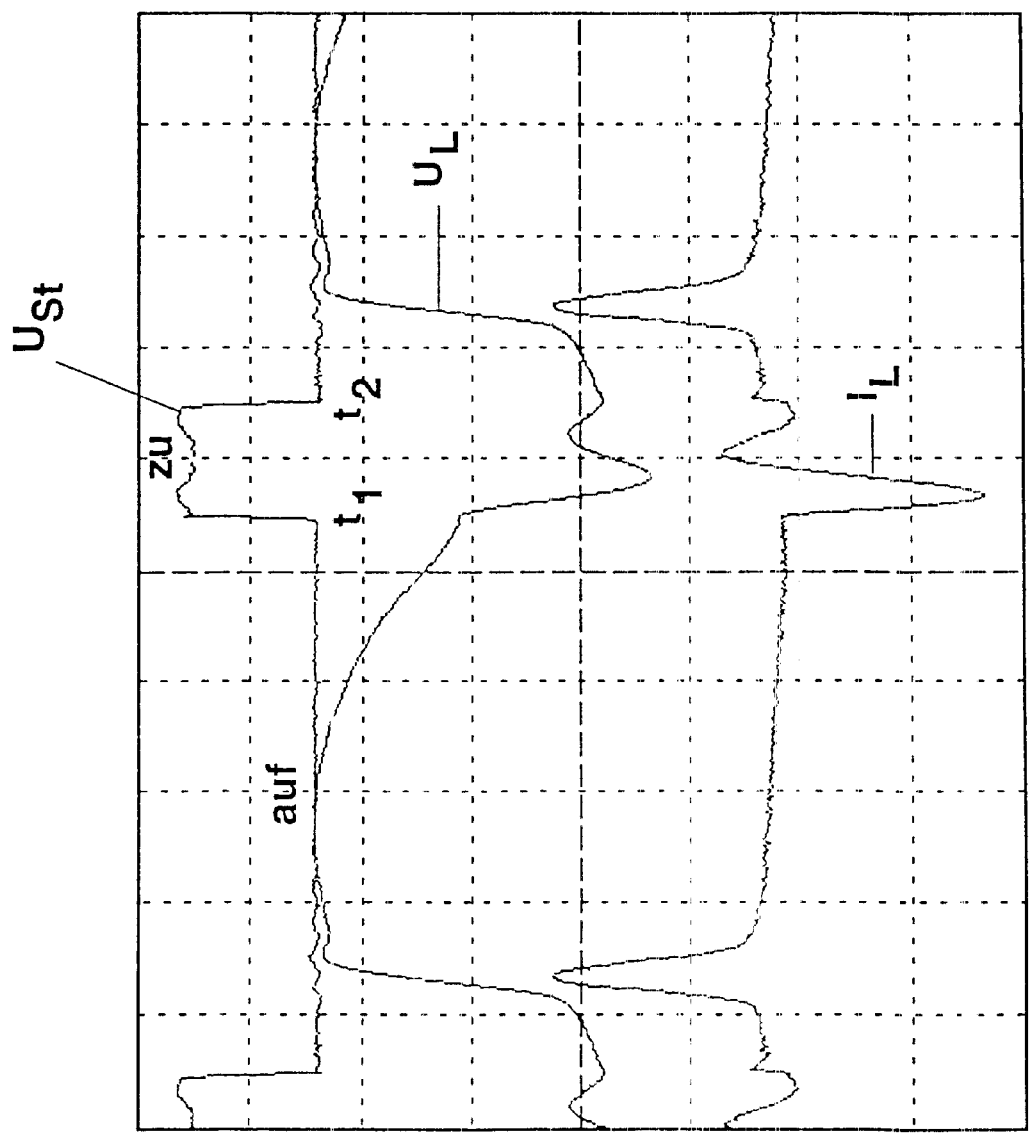
FIG. 5 shows exemplary measurement curves for an actual operation of a forward converter ballast according to the invention.
Figure 6:
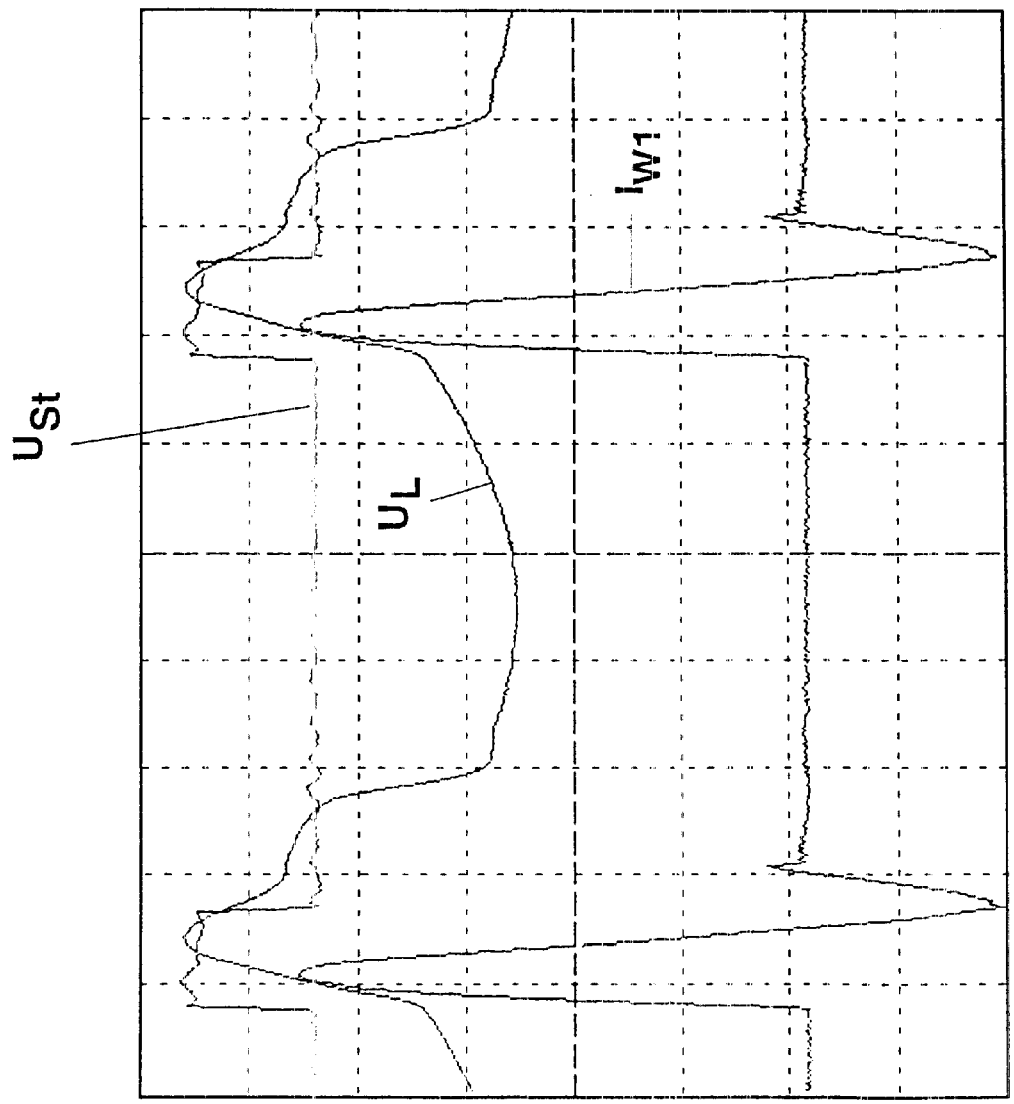
FIG. 6 shows a diagram with further exemplary measurement curves for the actual operation of the forward converter ballast according to the invention.

This can be seen more clearly from the actual measurement curves in FIGS. 5 and 6, which illustrate the control voltages $U_{st}$ at the switch $T_Q$, the external lamp voltage $U_L$, which is inverted in FIG. 6 compared with FIGS. 3, 4 and 5, the lamp current $I_L$, and also the primary-circuit-side transformer current $I_{W1}$. A time unit in the diagrams in FIGS. 5 and 6, i.e. the distance between the dotted lines, is 2 $\mu$s, and so the entire region illustrated is 20 $\mu$s.

The basic principle from FIG. 4 is again apparent in the illustration in FIG. 5, thus an attenuated harmonic is superposed on the external lamp voltage $U_L$ and the lamp current $I_L$ in the region between the first ignition and the back ignition. This effect is parasitic, does not qualitatively interfere with the principle according to the invention, and will not be explained any further here.

Moreover, the lamp voltage is not constant at zero in the dead time between a back ignition and the next first ignition, but rather exhibits a slight residual oscillation of an amount of energy remaining in the secondary circuit S, with a relatively low frequency. Incidentally, this frequency deviates from the frequency of the back oscillation of the external lamp voltage $U_L$ in the region of the back ignition because the (model-like) time-dependent resistance R(t) from FIG. 2 is practically infinite in the region of the dead time, or that is to say the switch $T_L$ is totally open in this time. By contrast, the discharge lamp L has a conducting phase in the region of the back ignition. Moreover, its capacitance C2(t) is also different in each case.

The similarity of the temporal profiles of the lamp current $I_L$ and of the internal voltage $U_i$ shows that the current through the lamp is driven by the internal voltage or by the field strength actually prevailing internally. Apart from the processes—not resolved in these figures—of ignition and extinction of the discharges themselves and the time variability of the discharge resistance, the internal voltage and the lamp current are thus in a direct relationship.

In FIG. 6, there can be seen on the primary winding current $I_{W1}$, in addition to the main pulse "triggering" the first ignition in the starting region of the conducting phase of the switch $T_Q$, that is to say the high-level phase of the voltage $U_{St}$, a second, smaller pulse toward the opposite side. This effect is attributed to an energy feedback in the remaining time phase of the closed state of the switch $T_Q$ after the first ignition, to be precise conveyed from the secondary circuit S via the transformer T into the primary circuit P. This energy feedback corresponds to a back induction by the charge already draining from the discharge lamp L, as can be seen from the already discernible fall in the signal $U_L$. After the maximum of the primary winding current $I_{W1}$, its derivative reverses, so that the induced voltage across the primary winding W1 changes its polarity.

This effect does not, in principle, interfere with the invention but should preferably not be excessively pronounced. It is represented in FIG. 6 basically only to afford a better understanding.

Although the back oscillation of the external lamp voltage $U_L$ initially corresponds to a largely free oscillation of the isolated secondary circuit S, it is then greatly attenuated by the back ignition. The attenuation by the back ignition considerably reduces the energy transported by the back oscillation to the transformer T in the sense of magnetization of the transformer T. This effect corresponds to the demagnetization of the transformer T by the back ignition in the sense of the invention. This dissipative process distinctly reduces the energy (including the remnants energy of the transformer core) which is capacitively stored to an extent unavoidably in the secondary circuit S in the discharge lamp L during the first ignition, thereby obviating the need for additional demagnetization circuits.

Figure 7:
FIG. 7 shows a diagram with measurement curves for the external voltage across and the current through the discharge lamp in the case of a mode of operation which differs in its particulars from FIGS. 5 and 6 but is in accordance with the invention.

FIG. 7 shows a further example—differing from FIGS. 5 and 6—of a possible time profile of the external lamp voltage $U_L$ and of the lamp current $I_L$ according to the invention. In order to be able to represent a few periods of the operating method, time intervals of 5 $\mu$s between the dotted lines have been chosen in FIG. 7. This example in FIG. 7 illustrates two essential points. Firstly, a very much smoother structure of the negative peak of the voltage $U_L$ can be discerned. This means that in this case the switch $T_Q$ was opened very much nearer the negative maximum of the external lamp voltage $U_L$, i.e. the relatively wide shoulder in the voltage profiles $U_L$ in FIGS. 4, 5 and 6 toward the back oscillation turns out narrower. In principle, the switch $T_Q$ can even be opened before the possible negative maximum of $U_L$ has been reached.

Accordingly, the peaks of the respective first ignition and back ignition in the lamp current $I_L$ lie closer together and are separated from one another by no discernible region of smaller currents. As a result, this example illustrates that, in the case of the invention, the active power coupling-in can in practice be closely contracted despite, in principle, separate forward and back ignitions, so that a uniform active power pulse results from this in the sense of the pulsed active power coupling-in.

Secondly, the strong sinusoidal fundamentals of the two curves illustrated in FIG. 7 are conspicuous, which are phase-shifted by $\pi/2$ relative to one another. This involves, in comparison with the residual oscillation of the secondary circuit S already explained with reference to FIG. 5, a very much more pronounced, largely active-power-free residual oscillation in the secondary circuit S in which an amount of residual energy which "is left behind" by the back ignition oscillates between the discharge lamp L as capacitor and the secondary winding W2 as inductance. FIG. 7 is intended to illustrate that such residual oscillations, even though they are disadvantageous, do not interfere with the basic principle of the invention for as long as the associated amplitudes or edge steepnesses of the external lamp voltage do not lead to undesirable ignitions in the actual dead time.

Figure 8:
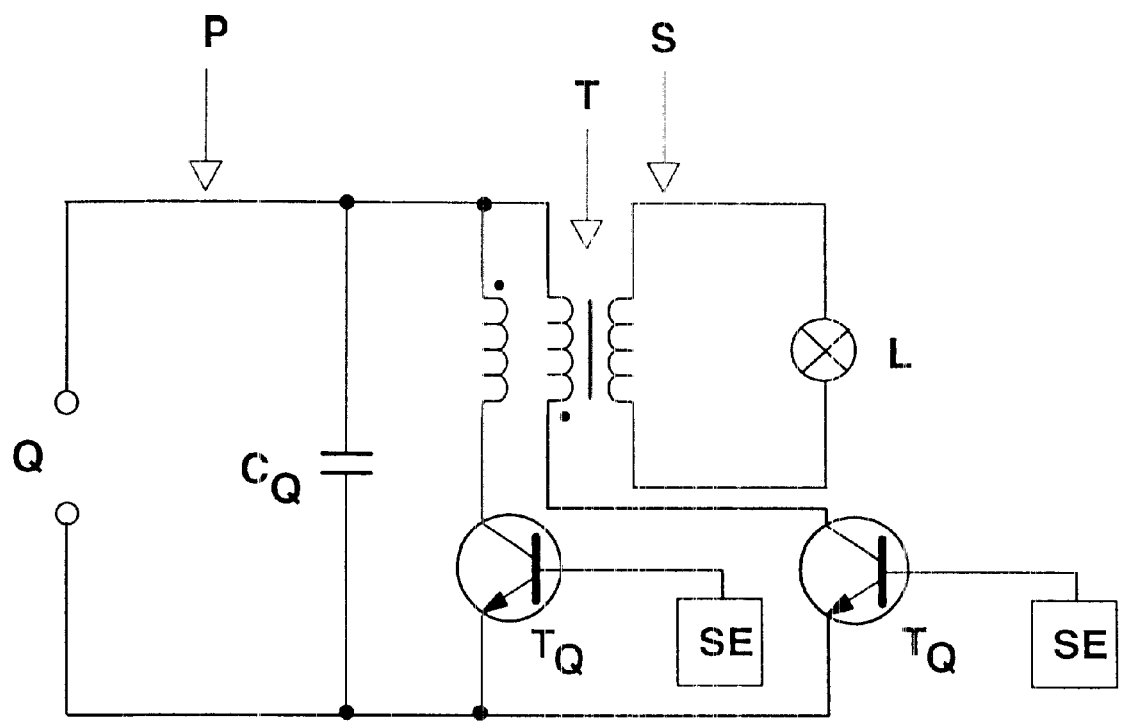
FIG. 8 shows a schematic block diagram—corresponding to FIG. 1—of a further illumination system according to the invention.

FIG. 8 shows a schematic circuit diagram which largely corresponds to FIG. 1. In this case, however, an exemplary embodiment which is -designed for a bipolar operating method is shown. Thus, external voltage pulses of alternating polarity are applied to the discharge lamp L. To that end, the transformer T has two primary windings depicted with opposite winding senses in FIG. 8. Each of the primary windings is electrically connected in series with an assigned switching transistor $T_Q$ with a dedicated control device SE. Of course, the two control devices can also be understood as two functions of a uniform control device; all that is intended to be symbolized is that the two primary windings are clocked alternately rather than jointly. As a result of the winding sense reversal between the two primary windings, the transformer T, upon the clocking of the primary windings, in each case generates voltage pulses of opposite polarity in the secondary circuit S. For the rest, the function corresponds entirely to the previous exemplary embodiment illustrated in FIG. 1. In summary, in the case of the circuit from FIG. 1, the assembly comprising the primary winding W1, the switch $T_Q$ and the control device SE is doubly embodied, a sign inversion being effected by the winding sense.

Figure 9:
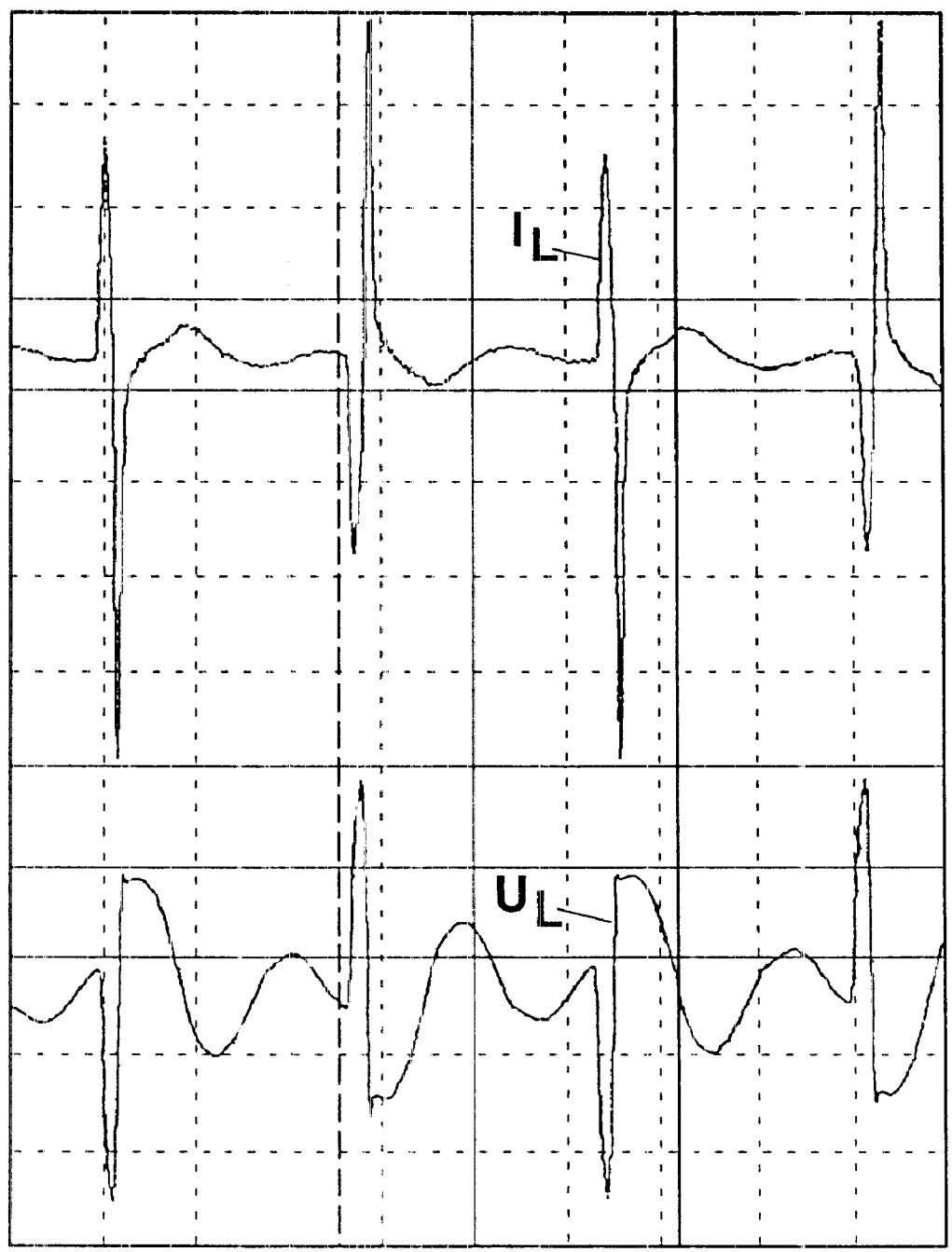
FIG. 9 shows a diagram—corresponding to FIG. 7—with measurement curves for the external voltage across and the current through the discharge lamp in the case of the illumination system according to FIG. 8.

FIG. 9 shows corresponding real measurement curves of the external lamp voltage $U_L$ and of the lamp current $I_L$. Great qualitative similarities with the curve profiles in FIG. 7 are apparent. However, it can be seen both from the ignition pulses of the external lamp voltage and from the lamp current pulses of forward ignition and back ignition that a bipolar operating method is involved. In contrast to the lamp current curve from FIG. 7, in this case the back ignition pulse is formed with a somewhat higher amplitude than the forward ignition pulse. However, there is no fundamental relationship with the bipolar operating method in this case.

In the manner illustrated, the invention utilizes the specific properties of a discharge lamp L with dielectrically impeded electrodes in order to provide an extremely simple electronic ballast which nevertheless has outstanding operating properties. What is essential in this case is the particular switching behavior of the switch $T_Q$ on account of the control by the control device SE. Furthermore, a significant part is played by the suitable coordination of the electrical engineering quantities and of the switching behavior with the respective lamp parameters. Therefore, the invention relates not only to the operating method but also to the correspondingly coordinated illumination system and also to a ballast provided with the control device according to the invention.

In addition to the simple structure of the ballast, the latter also has a quite considerably smaller structural volume and smaller weight than the comparable prior art because not only are fewer components used but also a design for smaller power levels is possible, in particular on the side of the primary circuit P.

In a construction example, the small structural size led to a volume which can be accommodated in a housing construction similar to a matchbox. This affords considerable advantages with regard to installation possibilities in flat screens, in which the discharge lamps considered here are of major interest as backlighting systems. An essential advantage of such flat screens consists precisely in their small structural size in comparison with conventional electron beam tubes, but said small structural size consequently also leaves only a small volume for installing a backlighting system. In this case, the flat radiators with dielectrically impeded discharges which can typically be made very flat can be used highly advantageously in conjunction with the ballasts according to the invention.

In addition to the possible application as an illumination system for a flat screen, a further example shall be presented here. In this respect, reference is made to DE 197 18 395 C1, whose disclosure content is incorporated here with regard to the structures, the properties of the copying lamp described therein, and also the application possibilities thereof. The copying lamp represented in principle therein was tested with the following concrete data in the case of an illumination system according to the invention. With a rod-type copying lamp having a length of 30 cm and an external diameter of 8 mm with a tube wall of 0.6 mm, a flashover distance of 6.5 mm resulted for the dielectically impeded discharges. The dielectric barriers each had a thickness of approximately 170 μm and were composed of glass solder on which, as on the remaining wall, $TiO_2$ and luminescent material were deposited. The $TiO_2$ is recessed in the region of an aperture. With a filling of 160 Torr xenon, an average lamp power of 11 W resulted using a unipolar electronic ballast according to the invention, having the following components: three ceramic multilayer capacitors each of 10 μF were used as storage capacitors $C_Q$ of the source Q supplied with 12 V DC voltage. The switch $T_Q$ was an RFP 70 N 80 transistor. The transformer was a double EFD 15, N 87 with a four-chamber coil former and a turns ratio of 1:70. In the manner just described, work was carried out with a center tap on the secondary side, which is not illustrated in FIG. 1 for the sake of simplicity. A very lightweight and compact electronic ballast with a volume of a matchbox was produced, which, moreover, exhibited a very good electromagnetic compatibility both with regard to radiation from the secondary circuit and with regard to back perturbation into the power supply system.

In the case of the copying lamp considered here, the essential advantage is that the electronic ballast can travel with the holding device for the copying lamp itself during copying operation, that is to say can be mounted directly beside the copying lamp. By virtue of the considerably reduced lead lengths and by virtue of the resultant immobility of the leads, significant advantages are produced with regard to the safety, durability and reliability of the high-voltage lines between the electronic ballast and the copying lamp. The lead capacitances are also reduced as a result, for which reason the electronic ballast in conjunction with the low capacitance of the copying lamp itself can generate a very good pulse shape.

The obviation of the need to mount a moving high-voltage line means that many conventionally necessary components are also omitted and the assembly outlay when producing a copier is thus considerably reduced.

Analogous advantages also apply to other applications of such linear radiators in the context of document illumination in fax machines, scanners, etc.

A further essential area of application for the invention is in the field of the electrical supply of flat radiators for dielectically impeded discharges. In this respect, reference is made to WO98/43277. The disclosure content of this application is incorporated here by reference.

What is claimed is:

1. An illumination system comprising:
   a discharge lamp (L) having a dielectric layer between at least one electrode and a discharge medium and
   a ballast including a power-supplied primary circuit (P), a secondary circuit (S), into which the discharge lamp (L) is connected, a transformer (T) which connects the primary circuit (P) to the secondary circuit (S), and a storage capacitor ($C_Q$) connected in parallel with a series circuit including a switching device ($T_Q$, SE) and the primary circuit (P), the ballast impresses a voltage pulse on the secondary circuit (S) from the primary circuit (P) via the transformer (T), and the ballast interacting with the discharge lamp (L) in such a way that the voltage pulse leads to an external voltage ($U_L$) effecting an ignition across the discharge lamp (L) and to an internal counterpolarization in the discharge lamp (L), a charge effecting the external voltage ($U_L$) across the discharge lamp (L) is withdrawn from the discharge lamp (L) and a back ignition is produced in the discharge lamp (L) with aid of the internal counterpolarization remaining in the discharge lamp (L).

2. The illumination system according to claim 1, wherein the transformer (T) of the ballast is demagnetized by the back ignition.

3. The illumination system according to claim 1, wherein the secondary circuit (S) has a natural frequency of at least 100 kHz.

4. The illumination system according to claim 1, wherein the secondary circuit (S) has a natural frequency of at most 33 kHz.

5. A ballast for a discharge lamp (L) having a dielectric layer between at least one electrode and a discharge medium, said ballast comprising:

a power-supplied primary circuit (P), a secondary circuit (S) for the discharge lamp (L) and a transformer (T) which connects the primary circuit (P) to the secondary circuit (S), the ballast being a forward converter for impressing a voltage pulse from the primary circuit (P) via the transformer (T) to the secondary circuit (S) in order to produce at the discharge lamp (L) an external voltage ($U_L$) effecting an ignition and an internal counterpolarization, the ballast has, in the primary circuit (P), a switching device ($T_Q$, SE) which interrupts, after the ignition, a primary-side current flow ($I_{W1}$) through the transformer (T) for isolating the secondary circuit (S), in order to allow an oscillation of the secondary circuit (S), in order to withdraw the charge effecting the external voltage ($U_L$) across the discharge lamp (L) and to lead to a back ignition by virtue of the internal counterpolarization in the discharge lamp (L).

6. The ballast according to claim 5, wherein the primary circuit (P) is supplied with power from a source (Q) with a ceramic multilayer capacitor ($C_Q$) as storage capacitor.

7. The ballast according to claim 5, wherein the transformer (T) has a center tap in the secondary circuit.

* * * * *